Figures 1, 2:
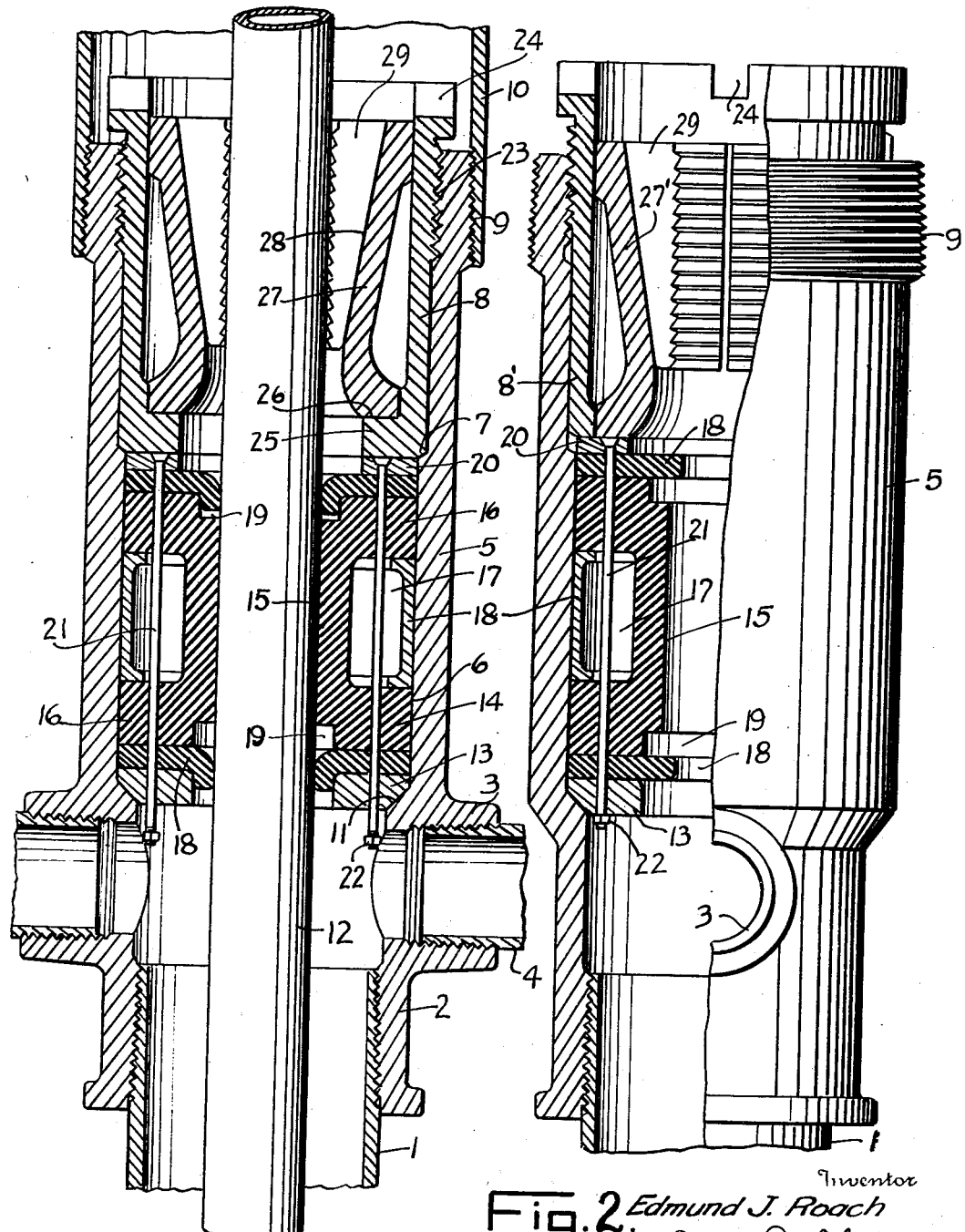

Oct. 15, 1935.  E. J. ROACH  2,017,219

TUBING HEAD

Filed May 20, 1935

Inventor
Edmund J. Roach
Jesse R. Stone
Lester B. Clark
By
Attorneys

Patented Oct. 15, 1935

2,017,219

UNITED STATES PATENT OFFICE 2,017,219

TUBING HEAD

Edmund J. Roach, Beaumont, Tex., assignor to Beaumont Iron Works Company, Beaumont, Tex., a corporation Application May 20, 1935, Serial No. 22,445

11 Claims. (Cl. 166—14)

The invention relates to tubing heads to be used at the upper end of a casing with which deep wells are equipped.

It is an object of the invention to provide means in connection with the casing head to form a seal around an inner pipe, such as a tubing or the like, said sealing means being compressible to allow the passage therethrough of the couplings upon the inner pipe.

It is a further object of the invention to provide a packing member to be fitted within the casing head, so constructed that it may be compressed longitudinally to provide a close seal around the inner pipe and to secure said packer in position sealed about said pipe.

It is a further object of the invention to provide a packer within the casing head and means holding said packer in position equipped so as to support thereon the pipe or tubing extending axially through said packer.

I desire to arrange the supporting member for the tubing in such manner that the load of the tubing may be exerted upon the packer to hold the same in compressed position when desired.

It is a further object of the invention to provide a packing member having flexible sealing walls to engage with the tubing and to be expanded outwardly by the coupling thereon and to reenforce said packing member against undue longitudinal compression.

In the drawing herewith, Fig. 1 shows a central longitudinal section through a casing head and packer employing my invention.

Fig. 2 is a similar view of a slightly different embodiment of the said invention.

My device is shown as mounted upon the upper end of a well casing 1. Said device includes a casing head 2 mounted upon the casing as previously noted and having one or more lateral ports 3 within which fluid conducting pipes 4 may be engaged. Above the lateral ports is a cylindrical upper extension 5 forming the inner chamber 6, also cylindrical in shape. At the upper end of the chamber 6 is a downwardly beveled shoulder 7 above which the chamber is slightly enlarged to provide a housing for a locking sleeve 8. The upper end of the casing head is threaded on its outer periphery at 9 to engage with an upwardly extending pipe or other member 10.

At the lower end of the chamber 6 is an inwardly tapered shoulder 11, which forms a support for my packing assembly, which is intended to fit between the walls of said chamber 6 and an inner pipe or tubing 12.

My packing assembly includes a lower annular plate or ring 13, which has a beveled lower surface adapted to fit within the seat 11 and form a supporting member for the packing device. Said packing device comprises a sleeve 14 of rubber or similar flexible material and it is to be understood that by rubber it is intended to include any similar flexible and elastic material. Said sleeve has an inner wall 15 to engage with the pipe 12. At the upper and lower ends of the packing sleeve are outwardly extending flanges 16 which engage with the inner wall of the chamber.

Between said flanges 16 is an annular recess 17 which provides a space permitting the bulging of the inner wall outwardly when the coupling members upon the pipe are forced through the packer.

The upper and lower flanges 16 are reenforced or spaced apart by a spacing ring 18 of rigid material. Said ring has its opposite ends flanged inwardly so as to provide a supporting surface at both ends thereof engaging with the flanges of the packer and acting to limit the longitudinal compression of the packing member in an obvious manner.

At the upper and lower ends of the packing sleeve 14 are wiping rings 18, also of rubber or similar material. As will be noted, particularly in Fig. 2, they extend materially inside the inner wall of the packer so as to be compressed outwardly by the inner pipe 12. To allow the flexing of the inner margin of these flexible rings 18, tne packer sleeve 14 is recessed at both ends, as shown at 19, to allow the distortion of the inner margin of the wiping rings 18 therein, as shown particularly at the upper end of the packing sleeve in Fig. 1.

Above the packing member is a ring 20 of metal or other rigid material which protects the upper end of the packing member and also serves as a support for through rods or bolts 21 extending longitudinally through the said upper ring 20 and through the assembly of the packing members 14, 18 and 13, and having the lower ends threaded to receive nuts 22. In normal position these rods are as shown in Fig. 2, with the nuts 22 thereon engaging the lower supporting ring 13, but when they are compressed longitudinally, as seen in Fig. 1, the rods may slide downwardly through the assembled parts to allow for such compression.

The locking sleeve 8, which is seated on the shoulder 7, as previously noted, is adapted to be screwed within the housing above the packer. It is threaded at 23 to engage therewith and may be screwed downwardly in the bushing toward the seat 7 to engage the packer and compress the same longitudinally. The upper end of the locking sleeve or bowl 8 has lateral notches 24 therein so as to provide means for rotating the same as it is screwed into its seat.

In Fig. 1 I have shown the lower end of the locking sleeve 8 as provided with an inwardly extending flange 25, which has an upper shoulder 26 to support a slip bowl 27. Said slip bowl is adapted to fit within the locking sleeve at both its upper and lower ends. Between the ends the wall of the slip bowl is tapered inwardly to provide a seat at 28 for pipe-engaging slips 29. Said slips may be of ordinary construction and consist of two or more jaws and in the drawing I have shown four such jaws. It will be seen that when the slips 29 are in position within the seat 28 the inner toothed surfaces of said slips engage the pipe and act to support the same.

In Fig. 2 the slip bowl 27' is not supported upon an inner flange upon the locking sleeve but said locking sleeve 8' is formed to allow the slip bowl to pass therethrough and rest upon the upper ring 20 of the packer assembly. It will be obvious that when this is done the weight of the pipe or tubing may be exerted downwardly upon the packer so as to compress the same due to the load sustained by the slips.

In use this packing device may be employed while the tubing is being introduced into the well or withdrawn therefrom under pressure. While the tubing is being lowered therethrough the slips 29 will, of course, be withdrawn from their position in the slip bowl. The couplings upon the pipe as said pipe is lowered will be allowed to expand the packing members so as to preserve a seal during the passage of the coupling through the packer. The manner in which this is done is obvious. The upper and lower plates 18 upon the packing member fit closely about the tubing and will be deflected in the direction of movement of the tubing. While I have shown the tubing as being in position going into the hole in Fig. 1, it is obvious that where the tubing is being withdrawn the upper and lower packing washers 18 will be deflected in the opposite direction. In either case they preserve a wiping and sealing contact with the tubing. In Fig. 1, the locking sleeve 8 is shown as being screwed entirely down to the seat 7 and compressing the packing member as far as is possible. It will be understood, however, that this sleeve will be screwed down only so far as it is necessary to properly expand the packer and may be above the seat 7, as shown in Fig. 2.

In the modification of the invention shown in Fig. 2, when the tubing is at rest supported upon the packing member, the weight of said tubing will exert a longitudinal compressive movement upon the packer which tends to form a close seal. It will thus be seen that I have provided a simple packing member which will act positively to maintain a seal during the movement of the tubing or other pipe longitudinally through the same.

What is claimed as new is:

1. A tubing head including a well casing, a casing head on said casing having a lateral outlet, a downwardly tapered shoulder above said outlet, a cylindrical chamber above said shoulder, a packer in said chamber including an annular plate adapted to fit said shoulder, a rubber packing sleeve supported on said plate, said sleeve having an inner flexible wall to engage an inner pipe, flexible rubber wiping rings at the upper and lower ends of said sleeve of smaller internal diameter than said inner pipe, a metallic ring at the upper end of said packer, means to hold said plate, sleeve and rings assembled together as a unit, and means to retain said packer on said shoulder.

2. A tubing head including, a well casing, a casing head on said casing having a lateral, outlet, a downwardly tapered shoulder above said outlet, a cylindrical chamber above said shoulder, a packer in said chamber including an annular plate adapted to fit said shoulder, a rubber packing sleeve supported on said plate, said sleeve having an inner flexible wall to engage an inner pipe, an annular expansion recess outside said wall, flexible rubber wiping rings at the upper and lower ends of said sleeve of smaller internal diameter than said inner pipe, a metallic ring at the upper end of said packer, means to hold said plate, sleeve and rings assembled together as a unit, and means to retain said packer on said shoulder.

3. A tubing head including, a well casing, a casing head on said casing having a lateral outlet, a downwardly tapered shoulder above said outlet, a cylindrical chamber above said shoulder, a packer in said chamber including an annular plate adapted to fit said shoulder, a rubber packing sleeve supported on said plate, said sleeve having an inner flexible wall to engage an inner pipe, outwardly extending flanges at the upper and lower ends of said sleeve to engage the walls of said chamber, flexible rubber wiping rings at the upper and lower ends of said sleeve, a metallic ring at the upper end of said packer, means to hold said plate, sleeve and rings assembled together as a unit, and means to retain said packer on said shoulder.

4. A tubing head including, a well casing, a casing head on said casing having a lateral outlet, a downwardly tapered shoulder above said outlet, a cylindrical chamber above said shoulder, a packer in said chamber including an annular plate adapted to fit said shoulder, a rubber packing sleeve supported on said plate, said sleeve having an inner flexible wall to engage an inner pipe, outwardly extending flanges on said sleeve at its ends and rigid spacing means between said flanges, flexible rubber wiping rings at the upper and lower ends of said sleeve, a metallic ring at the upper end of said packer, means to hold said plate, sleeve and rings assembled together as a unit, and means to retain said packer on said shoulder.

5. A tubing head including, a well casing, a casing head on said casing having a lateral outlet, a downwardly tapered shoulder above said outlet, a cylindrical chamber above said shoulder, a packer in said chamber including an annular plate adapted to fit said shoulder, a rubber packing sleeve supported on said plate, said sleeve having an inner flexible wall to engage an inner pipe, flexible rubber wiping rings at the upper and lower ends of said sleeve positioned to engage said pipe, a metallic ring at the upper end of said packer, means to hold said plate, sleeve and rings assembled together as a unit, means to retain said packer on said shoulder, and means fitting within said retaining means to support said pipe and compress said packer longitudinally.

6. A casing head, an inner lower shoulder therein, a cylindrical chamber above said shoulder, a locking sleeve seat above said chamber, a locking sleeve therein, a packing member between said locking sleeve and said shoulder, including upper and lower wiping rings to engage an inner pipe, a packing sleeve between said wiping rings, the inflanges on said packing sleeve engaging the wall of said chamber, means to space said flanges apart, a lower supporting ring on said packing member, and means to secure said rings and packing sleeve together.

7. A casing head, an inner lower shoulder therein, a cylindrical chamber above said shoulder, a locking sleeve seat above said chamber, a locking sleeve therein, a packing member between said locking sleeve and said shoulder including upper and lower wiping rings to engage an inner pipe, a packing sleeve between said wiping rings, the inner wall of which engages said inner pipe, outer flanges on said packing sleeve engaging the wall of said chamber, means to space said flanges apart, a lower supporting ring on said packing member, means to secure said rings and packing sleeve together and means in said locking sleeve to support said pipe and compress said packing member.

8. A casing head, an inner shoulder thereon adjacent the lower end thereof, a chamber above said shoulder, a packing member on said shoulder including a lower supporting ring, a wiping ring on said supporting ring, a packing sleeve, upper and lower chamber-engaging flanges on said sleeve, a rigid spacing ring between said flanges, an upper protecting ring, means to compress said packing member toward said seat.

9. A casing head, an inner shoulder thereon adjacent the lower end thereof, a chamber above said shoulder, a packing member on said shoulder including a lower supporting ring, a wiping ring on said supporting ring, a packing sleeve, upper and lower chamber-engaging flanges on said sleeve, a rigid spacing ring between said flanges, an upper protecting ring, a locking member engaging said protecting ring, and means in said locking member to support said inner pipe.

10. A packing member adapted to seal about a pipe within a casing head including a rubber sleeve having an inner pipe-engaging wall, outwardly extending cylindrical flanges at the upper and lower ends of said sleeve, a rigid spacing ring between said flanges, wiping rings at each end thereof, washers of metal at the ends of said member, and means to secure said washers, rings and sleeve together for movement as a unit.

11. A packing member adapted to seal about a pipe within a casing head including a rubber sleeve having an inner pipe engaging wall, outwardly extending cylindrical flanges at the upper and lower ends of said sleeve, a rigid spacing ring between said flanges, wiping rings of smaller internal diameter than the outer diameter of said inner pipe at each end thereof, said sleeve being recessed at each end to receive the inner margins of said wiping rings, washers of metal at the ends of said member, and means to secure said washers, rings and sleeve together for movement as a unit.

EDMUND J. ROACH.